(12) United States Patent
Watanabe et al.

(10) Patent No.: US 9,187,037 B2
(45) Date of Patent: Nov. 17, 2015

(54) STOP LAMP SWITCH ABNORMALITY DETECTING DEVICE

(71) Applicant: TOYOTA JIDOSHA KABUSHIKI KAISHA, Toyota-shi, Aichi (JP)

(72) Inventors: Ryochi Watanabe, Susono (JP); Hiroshi Ohmine, Nisshin (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 14/529,360

(22) Filed: Oct. 31, 2014

(65) Prior Publication Data

US 2015/0127214 A1 May 7, 2015

(30) Foreign Application Priority Data

Nov. 5, 2013 (JP) ................. 2013-229317

(51) Int. Cl.
*G01M 17/00* (2006.01)
*B60Q 11/00* (2006.01)
*B60Q 1/44* (2006.01)

(52) U.S. Cl.
CPC .............. *B60Q 11/005* (2013.01); *B60Q 1/44* (2013.01); *B60Q 1/441* (2013.01); *B60Q 11/00* (2013.01)

(58) Field of Classification Search
None
See application file for complete search history.

(56) References Cited

FOREIGN PATENT DOCUMENTS

JP 2001-080414 A 3/2001

*Primary Examiner* — Thomas Tarcza
*Assistant Examiner* — Garrett Evans
(74) *Attorney, Agent, or Firm* — Sughrue Mion, PLLC

(57) ABSTRACT

A stop lamp switch abnormality detecting device includes a stop lamp switch which is turned on and off in conjunction with ON operation and OFF operation of a brake pedal so as to switch a lighting state of a stop lamp; a control determining unit which determines whether a vehicle is suddenly steered; and a control selecting unit which determines whether the stop lamp switch is abnormal based on a state of the stop lamp switch and a determination result of the control determining unit, wherein the control selecting unit determines that the stop lamp switch is abnormal when it is determined that the stop lamp switch is maintained in an ON state at the time the control determining unit determines that the sudden steering operation is performed.

7 Claims, 6 Drawing Sheets

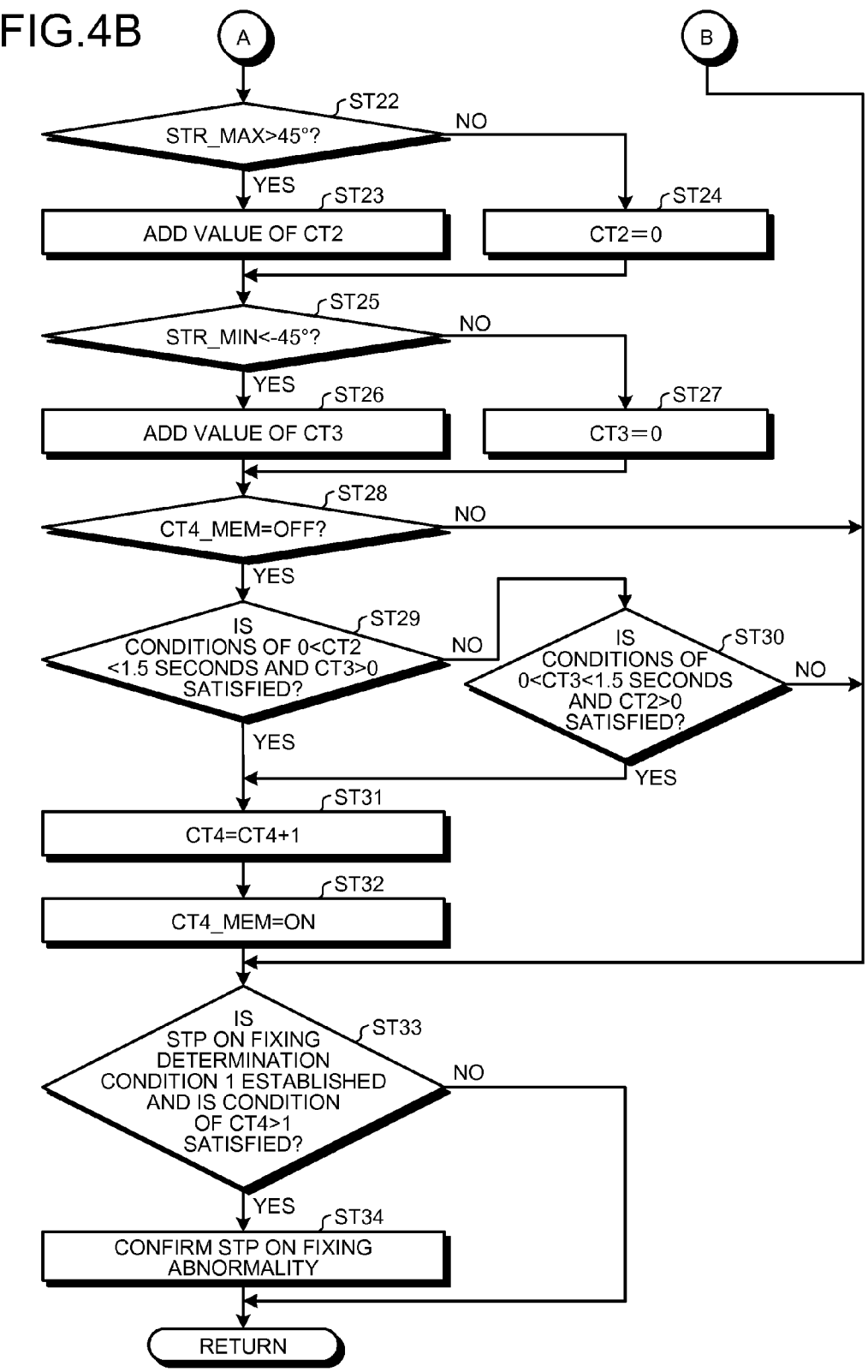

STOP LAMP SWITCH ABNORMALITY DETECTING DEVICE

CROSS-REFERENCE TO RELATED APPLICATIONS

The present application claims priority to and incorporates by reference the entire contents of Japanese Patent Application No. 2013-229317 filed in Japan on Nov. 5, 2013.

BACKGROUND OF THE INVENTION

1. Field of the Invention

The present invention relates to a stop lamp switch abnormality detecting device.

2. Description of the Related Art

A vehicle which travels along a general road is equipped with a stop lamp which is turned on in accordance with a brake operation as an operation of stepping on a brake pedal to brake the vehicle. The stop lamp is connected to a stop lamp switch which is turned on and off in accordance with the operation of the brake pedal. In this way, the stop lamp switch which turns on and off the stop lamp may be used for a purpose other than the case of selecting the lighting state of the stop lamp. For example, the stop lamp switch may be used to detect the state of the vehicle.

However, when the stop lamp switch is abnormal, the detection is not also appropriately performed. For this reason, there is known a vehicle which detects the abnormality of a stop lamp switch. For example, a stop lamp switch abnormality detecting device disclosed in Japanese Patent Application Laid-open No. 2001-80414 detects a state of a stop lamp switch while a vehicle travels and determines that the stop lamp switch is abnormal when the ON state of the stop lamp switch is maintained in the case where a vehicle wheel speed repeatedly increases and decreases a predetermined number of times.

Here, there is also known a driver who normally operates a plurality of pedals by both foots among various kinds of drivers who drive the vehicle. For this reason, a certain driver may have a habit of normally placing a foot on a brake pedal. The driver who has this habit may step on the brake pedal without a thought, and hence there is a possibility that the stop lamp switch is normally turned on in the vehicle traveling state regardless of the intension of stopping the vehicle. In this case, since the vehicle speed repeatedly increases and decreases a predetermined number of times while the stop lamp switch is maintained in an ON state, there is a concern that an erroneous determination for the abnormality may be made even when there is no abnormality in the stop lamp switch.

SUMMARY OF THE INVENTION

The invention is made in view of the above-described circumstances, and an object thereof is to provide a stop lamp switch abnormality detecting device capable of reliably determining the abnormality of a stop lamp switch.

According to one aspect of the present invention, a stop lamp switch abnormality detecting device includes a stop lamp switch configured to switch a lighting state of a stop lamp by changing turned on and turned off of the stop lamp switch in conjunction with ON operation and OFF operation of a brake pedal; a sudden steering determining unit configured to determine whether a vehicle is suddenly steered; and a stop lamp switch abnormality determining unit configured to determine whether the stop lamp switch is abnormal based on a state of the stop lamp switch and a determination result of the sudden steering determining unit, wherein the stop lamp switch abnormality determining unit determines that the stop lamp switch is abnormal when it is determined that the stop lamp switch is maintained in an ON state at the time the sudden steering determining unit determines that sudden steering operation is performed.

According to another aspect of the present invention, in the stop lamp switch abnormality detecting device, it is preferable that the stop lamp switch abnormality determining unit determines that the stop lamp switch is abnormal when continuously detecting a state where the stop lamp switch is in an ON state at the time the sudden steering determining unit determines that the sudden steering operation is performed a plurality of times.

According to still another aspect of the present invention, in the stop lamp switch abnormality detecting device, it is preferable that the sudden steering determining unit determines that the sudden steering operation is performed at the time detecting a state where a leftward steering angle becomes larger than a leftward threshold value and a rightward steering angle becomes larger than a rightward threshold value when the vehicle travels at a predetermined vehicle speed or more.

According to still another aspect of the present invention, in the stop lamp switch abnormality detecting device, it is preferable that the sudden steering determining unit determines whether the sudden steering operation is performed as a determination on whether lateral acceleration is generated at the time a driver performs the OFF operation of the brake pedal.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4B is a specific flowchart illustrating a process of determining the abnormality of the stop lamp switch by the stop lamp switch abnormality detecting device illustrated in FIG. 1.

DETAILED DESCRIPTION OF THE PREFERRED EMBODIMENTS

Hereinafter, an embodiment of a stop lamp switch abnormality detecting device according to the present invention will be described in detail with reference to the drawings.

Furthermore, the present invention is not limited to the embodiment. Further, the components of the embodiment below include a component which may be replaced by the person skilled in the art, a component which may be easily realized, or a component which has substantially the same configuration.

Embodiment

Figure 1:
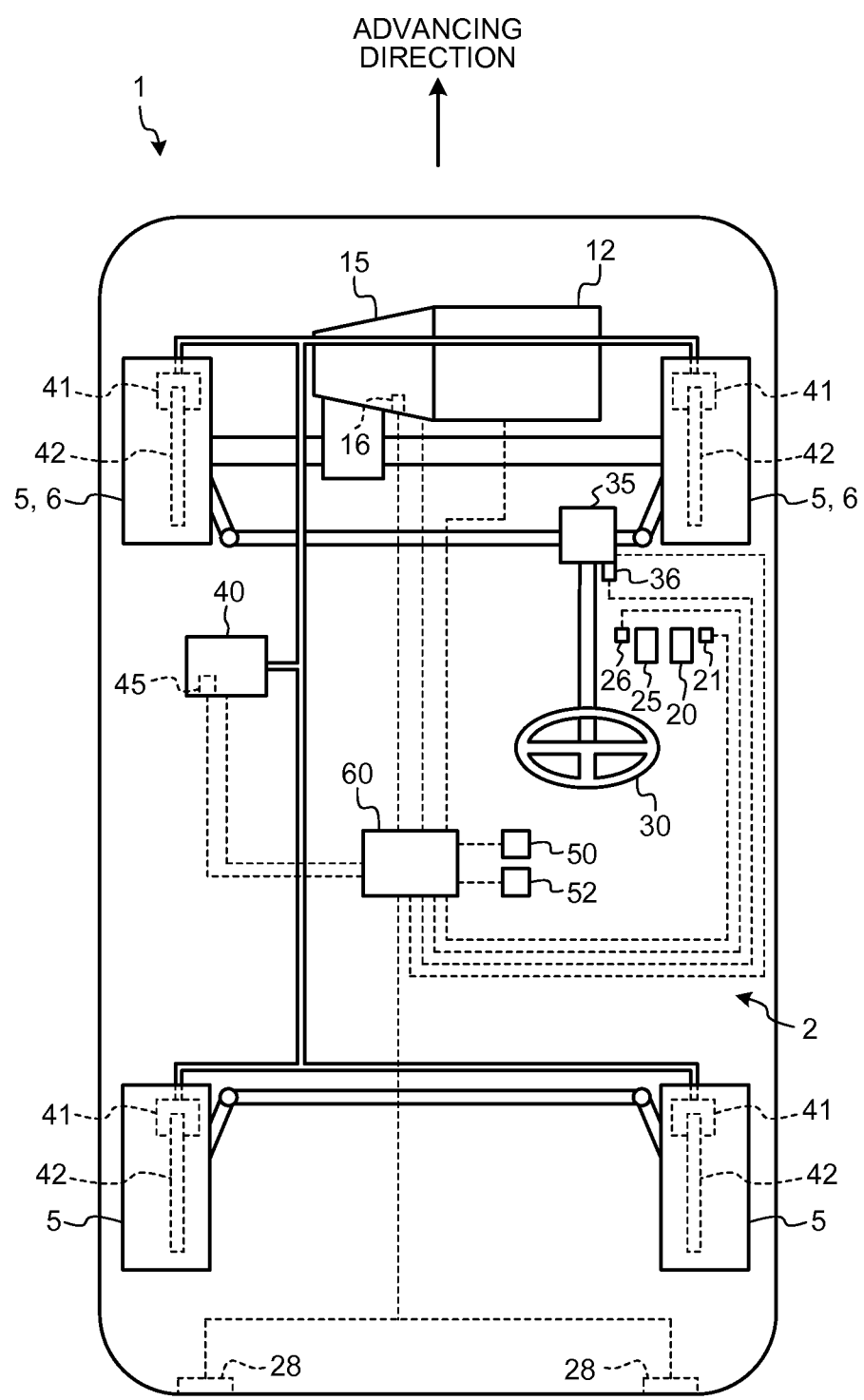
FIG. 1 is a schematic diagram of a vehicle including a stop lamp switch abnormality detecting device according to an embodiment.

FIG. 1 is a schematic diagram of a vehicle including a stop lamp switch abnormality detecting device according to the embodiment. A vehicle 1 including a stop lamp switch abnormality detecting device 2 according to the embodiment is equipped with an engine 12 as an internal combustion engine corresponding to a power source, and can travel in a manner such that the power generated by the engine 12 is transmitted to a vehicle wheel 5 via a driving device such as a transmission device 15. The driving device is equipped with a vehicle speed sensor 16 as a vehicle speed detecting means which detects the vehicle speed by detecting the rotation speed of the output shaft of the driving device.

The vehicle 1 is equipped with a brake device as a braking means which stops the traveling vehicle 1 by braking the vehicle wheel 5, and is equipped with a brake hydraulic pressure control device 40 which controls a hydraulic pressure when the brake device is operated. The brake hydraulic pressure control device 40 is equipped with a master cylinder (not illustrated) which converts a stepping force generated by the operation of a brake pedal 25 into a hydraulic pressure and a master cylinder pressure sensor 45 which detects the hydraulic pressure generated by the master cylinder. The brake hydraulic pressure control device 40 is configured to independently control the hydraulic pressure of each wheel cylinder 41 which is used in combination with a brake disk 42 and is provided in the vicinity of each vehicle wheel 5. Accordingly, the brake hydraulic pressure control device 40 is configured to independently control the braking forces of the vehicle wheels 5.

Further, the vehicle 1 is equipped with an accelerator pedal 20 and a brake pedal 25 which are used during the driver's driving operation, and an accelerator opening degree sensor 21 which detects the operation amount of the accelerator pedal 20 is provided in the vicinity of the accelerator pedal 20 among these pedals. Further, a stop lamp switch 26 is provided in the vicinity of the brake pedal 25 so as to turn on a stop lamp 28 which transmits the operation state of the brake pedal 25 to the subsequent vehicle when the brake pedal 25 is operated.

When the brake pedal 25 is stepped on, the stop lamp switch 26 becomes an ON state in which the stop lamp 28 is turned on. Meanwhile, when the brake pedal 25 is not operated, the stop lamp switch 26 becomes an OFF state in which the stop lamp 28 is not turned on. That is, the stop lamp switch 26 can change the lighting state of the stop lamp 28 while becoming an ON state or an OFF state according to the ON state or the OFF state of the brake pedal 25. Further, the stop lamp 28 is disposed at the rear end of the vehicle 1 so as to transmit the operation state of the brake pedal 25 to the subsequent vehicle.

Furthermore, the vehicle 1 is equipped with a steering wheel 30 which is used when the driver steers a front wheel 6 as a steering wheel, and the steering wheel 30 is connected to an electric power steering (EPS) device 35. Accordingly, the steering wheel 30 is configured to steer the front wheel 6 via the EPS device 35. Further, the EPS device 35 with the above-described configuration is equipped with a steering angle sensor 36 as a steering angle detecting means which detects the steering angle as the rotation angle of the steering wheel 30.

Further, the vehicle 1 is equipped with a lateral acceleration sensor 52 capable of detecting at least the acceleration of the vehicle 1 in the width direction and a yaw rate sensor 50 as a yaw rate detecting means capable of detecting the yaw rate generated when the vehicle 1 travels. The vehicle speed sensor 16, the accelerator opening degree sensor 21, the stop lamp switch 26, the steering angle sensor 36, the yaw rate sensor 50, the lateral acceleration sensor 52, the master cylinder pressure sensor 45, the EPS device 35, the brake hydraulic pressure control device 40, the engine 12, and the transmission device 15 are connected to an electronic control unit (ECU) 60 which controls the components of the vehicle 1, and are installed so as to be controllable by the ECU 60.

Figure 2:
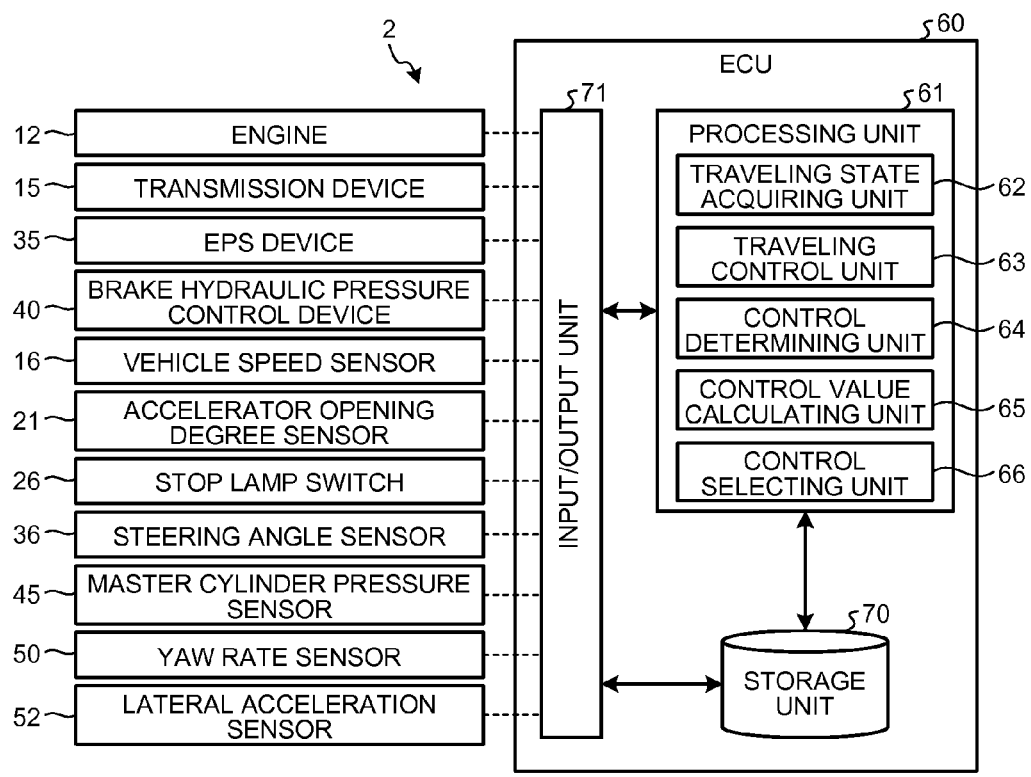
FIG. 2 is a main configuration diagram of the stop lamp switch abnormality detecting device illustrated in FIG. 1.

FIG. 2 is a main configuration diagram of the stop lamp switch abnormality detecting device illustrated in FIG. 1. The ECU 60 is equipped with a processing unit 61 which includes a central processing unit (CPU) or the like, a storage unit 70 such as a random access memory (RAM), and an input/output unit 71, and these components are connected to one another so that a signal can be transmitted and received. Further, sensors and switches such as the vehicle speed sensor 16, the accelerator opening degree sensor 21, the stop lamp switch 26, the steering angle sensor 36, the yaw rate sensor 50, and the lateral acceleration sensor 52 connected to the ECU 60 or devices such as the EPS device 35, the brake hydraulic pressure control device 40, the engine 12, and the transmission device 15 are connected to the input/output unit 71, and the input/output unit 71 inputs and outputs a signal among the sensors or the devices. Further, the storage unit 70 stores a computer program controlling the vehicle 1.

Further, the processing unit 61 of the ECU 60 with such a configuration includes a traveling state acquiring unit 62 which acquires the traveling state of the vehicle 1 or the driving operation state of the driver, a traveling control unit 63 which performs the traveling control for the vehicle 1, a control determining unit 64 which performs a determination in the traveling control for the vehicle 1, a control value calculating unit 65 which calculates various control values used in the traveling control for the vehicle 1, and a control selecting unit 66 which changes the controls of the vehicle 1 or the flag used in the traveling control.

In the case where the ECU 60 performs the control of the vehicle 1, the processing unit 61 performs a calculation process by reading the computer program from a memory embedded in the processing unit 61, for example, based on the detection result of the accelerator opening degree sensor 21 or the like, and controls the engine 12 or the transmission device 15 in response to the calculation result, so that the driving control of the vehicle 1 is performed. At this time, the processing unit 61 appropriately stores numerical values used for the calculation in the storage unit 70, and performs a calculation process by reading the stored numerical values.

The stop lamp switch abnormality detecting device 2 according to the embodiment has the above-described configuration, and the operation thereof will be described below. When the vehicle 1 including the stop lamp switch abnormality detecting device 2 travels, a detecting means such as the accelerator opening degree sensor 21 detects the driver's driving operation state such as the operation amount for the accelerator pedal 20, and the traveling state acquiring unit 62 that belongs to the processing unit 61 of the ECU 60 acquires the detection result. The driving operation state or the like which is acquired by the traveling state acquiring unit 62 is transmitted to the traveling control unit 63 that belongs to the processing unit 61 of the ECU 60.

The traveling control unit 63 performs the traveling control for the vehicle 1 based on the driving operation state or the like acquired by the traveling state acquiring unit 62. When the traveling control for the vehicle 1 is performed, a fuel injection control or an ignition control of the engine 12 is performed in response to the traveling state or the like transmitted from the traveling state acquiring unit 62, so that a desired power is generated by the engine 12 or the gear of the transmission device 15 is shifted so that a desired driving force is generated. When the devices are controlled in this way and the power generated by the engine 12 is transmitted to the vehicle wheel 5 provided as a driving wheel through the power transmission line such as the transmission device 15, a driving force is generated in the vehicle wheel 5.

Further, the vehicle speed is adjusted by generating not only a driving force, but also a braking force when the vehicle 1 travels. However, the driver operates the brake pedal 25 when a braking force is generated in the vehicle 1. The operation force which is generated by the operation of the brake pedal 25 is converted into a hydraulic pressure by the master cylinder of the brake hydraulic pressure control device 40, and is applied to the wheel cylinder 41 via a hydraulic line. The wheel cylinder 41 is operated by the hydraulic pressure, and decreases the rotation speed of the brake disk 42 rotating along with the vehicle wheel 5 by a friction force. Accordingly, since the rotation speed of the vehicle wheel 5 also decreases, the vehicle wheel 5 generates a braking force with respect to a road surface, and hence the vehicle 1 is decelerated.

Further, the brake hydraulic pressure control device 40 is capable of generating a hydraulic pressure based on the operation of the brake pedal 25 or regardless of the operation state of the brake pedal 25. Further, since the brake hydraulic pressure control device 40 can be controlled by the traveling control unit 63 of the ECU 60, the traveling control unit 63 can generate a braking force regardless of the operation state of the brake pedal 25 by controlling the brake hydraulic pressure control device 40.

Further, in the case where the advancing direction of the vehicle 1 is changed by turning the vehicle 1, a steering wheel operation is performed to rotate the steering wheel 30. In this way, when the steering wheel 30 is rotated, the rotation torque is transmitted to the EPS device 35. The EPS device 35 is operated in response to the rotation torque transmitted from the steering wheel 30, and outputs a pressure or a pulling force to a tie-rod provided between the EPS device 35 and the front wheel 6. Accordingly, since the front wheel 6 rotates, the rotation direction of the front wheel 6 becomes different from the front to back direction of the vehicle 1, the advancing direction of the vehicle 1 changes so that the vehicle turns.

In this way, the vehicle 1 turns by the operation of the steering wheel 30, and the steering angle which is changed by the operation of the steering wheel 30 is detected by the steering angle sensor 36 provided in the EPS device 35. The steering angle which is detected by the steering angle sensor 36 is transmitted to the traveling state acquiring unit 62 that belongs to the processing unit 61 of the ECU 60, and is acquired by the traveling state acquiring unit 62.

When the vehicle 1 turns, a yaw moment as a rotation force about the vertical axis of the vehicle 1 is generated in the vehicle 1. In this way, when the yaw moment is generated in the vehicle 1, the yaw rate sensor 50 detects a yaw rate as a yaw angular velocity when the vehicle 1 rotates about the vertical axis due to the generation of the yaw moment. The yaw rate which is generated by the yaw rate sensor 50 is transmitted to the traveling state acquiring unit 62 that belongs to the processing unit 61 of the ECU 60, and is acquired by the traveling state acquiring unit 62.

Further, when the vehicle 1 turns, a centrifugal force is generated in the vehicle 1, and hence acceleration is generated in the vehicle 1 in the width direction due to the centrifugal force. That is, lateral acceleration as acceleration in the lateral direction is generated. In this way, the lateral acceleration which is generated while the vehicle 1 turns is detected by the lateral acceleration sensor 52, and the detection result is acquired by the traveling state acquiring unit 62 that belongs to the processing unit 61 of the ECU 60. The yaw rate or the lateral acceleration which is detected by the traveling state acquiring unit 62 is appropriately used in the traveling control for the vehicle 1 that is performed by the traveling control unit 63.

Further, when the driver performs a driving operation, there is a case where the driving operation may be used in a purpose other than the direct traveling control for the vehicle 1. For example, when the driver operates the brake pedal 25, the stop lamp switch 26 is operated in accordance with the operation. Specifically, the stop lamp switch 26 becomes an OFF state in an OFF state as a state where the brake pedal 25 is not stepped on, and the stop lamp switch 26 becomes an ON state in an ON state as a state where the brake pedal 25 is stepped on (ON operation).

The state of the stop lamp switch 26 is acquired by the traveling state acquiring unit 62 that belongs to the processing unit 61 of the ECU 60, and the stop lamp 28 is turned on or off by the traveling control unit 63 in response to the acquired state of the stop lamp switch 26. That is, the traveling control unit 63 turns off the stop lamp 28 when the state of the stop lamp switch 26 acquired by the traveling state acquiring unit 62 is an OFF state, and turns on the stop lamp 28 when the state of the stop lamp switch 26 is an ON state.

Further, the stop lamp switch abnormality detecting device 2 according to the embodiment determines whether the stop lamp switch 26 is abnormal while the vehicle 1 travels. Regarding the determination on the abnormality of the stop lamp switch 26, it is determined that the stop lamp switch 26 is abnormal when the stop lamp switch 26 becomes an ON state although there is a sudden steering history due to the accelerator operation while the vehicle 1 travels. Furthermore, the sudden steering operation mentioned herein indicates an operation in which the vehicle 1 is continuously turned leftward and rightward when the vehicle 1 travels at a predetermined vehicle speed or more. Next, the outline of the process of determining the abnormality of the stop lamp switch 26 will be described.

Figure 3:
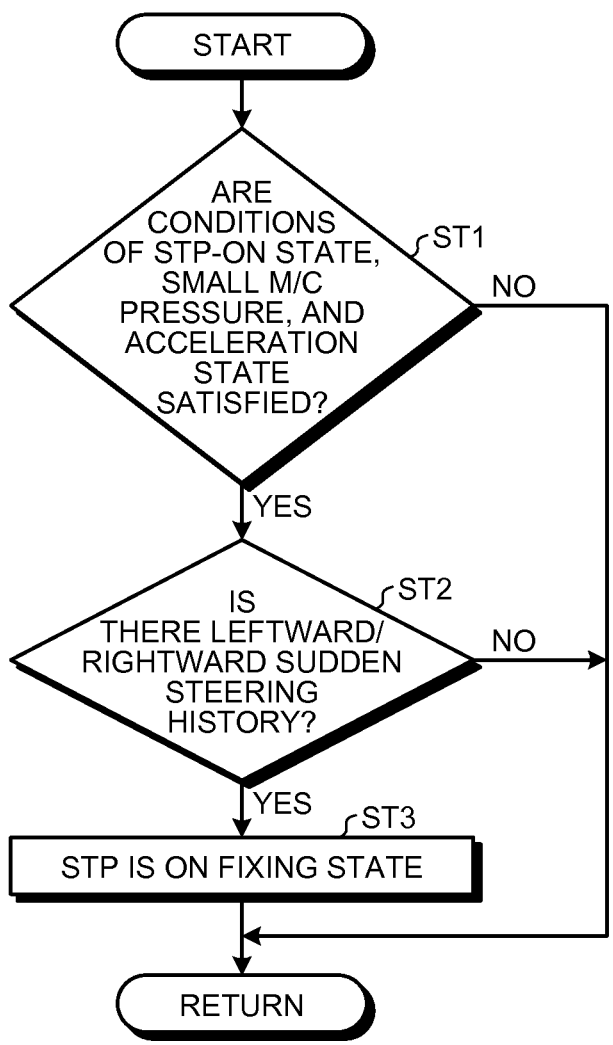
FIG. 3 is a flowchart illustrating an outline of a process of determining the abnormality of a stop lamp switch by the stop lamp switch abnormality detecting device illustrated in FIG. 1.

FIG. 3 is a flowchart illustrating an outline of a process of determining the abnormality of the stop lamp switch by the stop lamp switch abnormality detecting device illustrated in FIG. 1. The determination on whether the stop lamp switch 26 is abnormal is performed based on the driver's driving operation state acquired by the traveling state acquiring unit 62 that belongs to the processing unit 61 of the ECU 60. When this determination is made, it is first determined whether the state of the stop lamp switch 26 (hereinafter, referred to as a STP) acquired by the traveling state acquiring unit 62 is an ON state, the master cylinder pressure (hereinafter, referred to as a M/C pressure) as a hydraulic pressure generated by the master cylinder is small, and the vehicle 1 is in an acceleration state (step ST1). This determination is performed by the control determining unit 64 that belongs to the processing unit 61 of the ECU 60 based on the information items acquired by the traveling state acquiring unit 62.

For example, as for the determination of the STP, it is determined that the STP is an ON state when the state of the stop lamp switch 26 acquired by the traveling state acquiring unit 62 is an ON state, and it is determined that the STP is an OFF state when the state of the stop lamp switch 26 acquired by the traveling state acquiring unit 62 is an OFF state. Further, as for the determination of the M/C pressure, it is determined whether the M/C pressure is small based on the determination on whether the detection value of the master cylinder pressure sensor 45 acquired by the traveling state acquiring unit 62 is smaller than a predetermined value. Further, as for the determination on the acceleration state, it is determined that the vehicle 1 is in an acceleration state when the acquired detection value is a value used to determine that the vehicle 1 is in an acceleration state based on the detection values of the accelerator opening degree sensor 21 and the like acquired by the traveling state acquiring unit 62.

When any one of the determinations, that is, the determination on whether the STP is an ON state, the determination on whether the M/C pressure is small, and the determination on whether the vehicle 1 is in an acceleration state is not satisfied by these determinations (the determination of No in step ST1), the condition for determining whether the stop lamp switch 26 is abnormal is not satisfied, and hence the routine escapes from the process sequence. Furthermore, the determination on whether the vehicle 1 is in an acceleration state among these determinations includes not only a case where the vehicle speed increases, but also a case where the vehicle speed is constant. That is, this is a determination on whether the driver may travel the vehicle 1 by releasing a foot from the brake pedal 25.

On the contrary, when all determinations, that is, the determination on whether the STP is an ON state, the determination on whether the M/C pressure is small, and the determination on whether the vehicle 1 is in an acceleration state are satisfied (step ST1, the determination of Yes), it is determined whether there is a leftward/rightward sudden steering history (step ST2). The control determining unit 64 performs this determination on whether there is a leftward/rightward sudden steering history in the state where the condition in which the STP is an ON state, the M/C pressure is small, and the vehicle 1 is in an acceleration state is satisfied. That is, the control determining unit 64 determines whether there is a history in which a sudden steering operation is performed in at least one of the leftward direction and the rightward direction in the history of the detection value of the steering angle sensor 36 detected by the traveling state acquiring unit 62. When it is determined that the history of the leftward/rightward sudden steering operation does not exist by this determination (step ST2, the determination of No), the routine escapes from the process sequence.

On the contrary, when it is determined that the history of the leftward/rightward sudden steering operation exists in the state where the condition in which the STP is an ON state, the M/C pressure is small, and the vehicle 1 is in an acceleration state is satisfied (step ST2, the determination of Yes), it is determined that the STP is fixed to an ON state (step ST3). That is, when the stop lamp switch 26 is fixed to an ON state regardless of the state of the brake pedal 25, the determination is performed by the control selecting unit 66 that belongs to the processing unit 61 of the ECU 60. That is, when it is determined that the stop lamp switch 26 is maintained in an ON state despite of the determination on the sudden steering operation, it is determined that the stop lamp switch 26 is abnormal. Accordingly, the stop lamp switch abnormality detecting device 2 determines that the stop lamp switch 26 is abnormal if a determination is made in which the sudden steering operation is performed when the ON state of the stop lamp switch 26 is detected.

That is, when the vehicle 1 is steered to turn while the vehicle 1 travels, lateral acceleration is generated. For this reason, in the case where the sudden steering operation is performed, a foot which is not used to operate the pedal is shifted by the lateral acceleration or is moved to a footrest (not illustrated) so as to support a weight exerted in the lateral direction due to the lateral acceleration. Since the driver moves the foot in this way while the vehicle 1 travels, even the driver who habitually places a foot on the brake pedal 25 moves the foot from the brake pedal 25. Further, since a burden on the vehicle wheel 5 increases when the vehicle 1 turns suddenly, there is a need to reduce the burden on the vehicle wheel 5 even by a slight amount. For this reason, the driver does not need to step on the brake pedal 25 in order to reduce the burden on the vehicle wheel 5 when the vehicle is suddenly turned due to the sudden steering operation.

Further, when the stop lamp switch 26 is in an OFF state in which the brake pedal 25 is not stepped on (OFF operation), the stop lamp switch 26 also becomes an OFF state. For this reason, the stop lamp switch abnormality detecting device 2 according to the embodiment determines whether the stop lamp switch 26 becomes an ON state during the sudden steering operation in which large lateral acceleration is generated in order to determine whether the stop lamp switch 26 is an ON state when the brake pedal 25 is in an OFF state.

In order to realize these configurations, the control determining unit 64 determines whether the sudden steering operation is performed as the determination on the state where the driver releases the brake pedal 25 so that the lateral acceleration is generated. Meanwhile, the control selecting unit 66 determines that the stop lamp switch 26 is abnormal if it is determined that the stop lamp switch 26 is maintained in an ON state when the control determining unit 64 determines that the sudden steering operation is performed. The stop lamp switch abnormality detecting device 2 detects the abnormality of the stop lamp switch 26 in this way, and a sequence for the actual abnormality detection will be described below based on the basic thought for the detection of the abnormality.

Figure 4A:
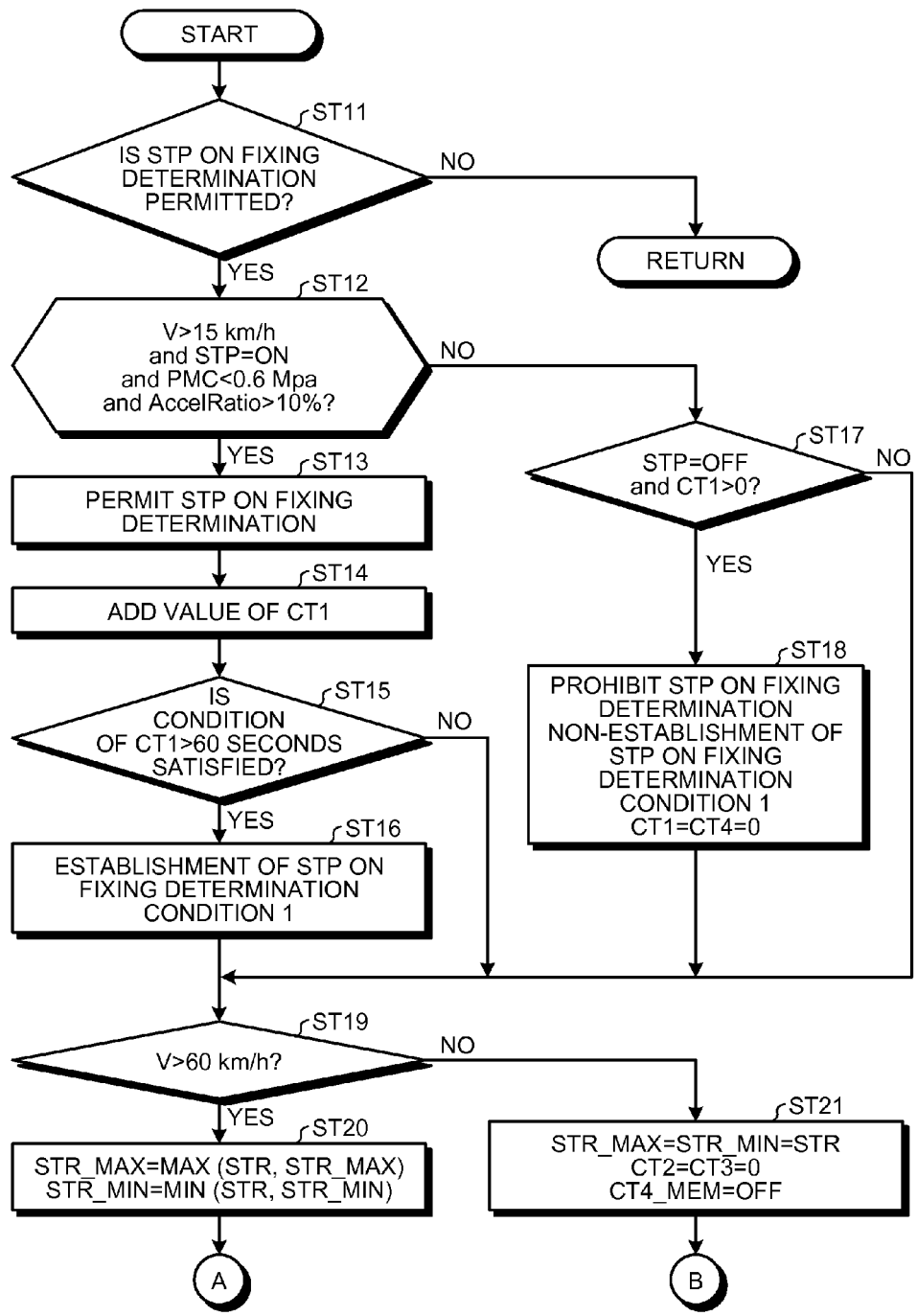
FIG. 4A is a specific flowchart illustrating a process of determining the abnormality of the stop lamp switch by the stop lamp switch abnormality detecting device illustrated in FIG. 1.

FIGS. 4A and 4B are specific flowcharts illustrating a process of determining the abnormality of the stop lamp switch by the stop lamp switch abnormality detecting device illustrated in FIG. 1. In the case where the abnormality of the stop lamp switch 26 is detected, it is first determined whether there is a permission for the STP ON fixing determination (step ST11). In this determination, the control determining unit 64 that belongs to the processing unit 61 of the ECU 60 determines whether the abnormality of the stop lamp switch 26 may be detected. For example, since the abnormality of the stop lamp switch 26 may not be detected when the vehicle 1 stops, the STP ON fixing determination is not permitted in this case (the determination of No in step ST11).

On the contrary, when it is determined that the STP ON fixing determination is permitted (step ST11, the determination of Yes), it is determined whether all conditions of V>15 km/h or more, STP=ON, PMC<0.6 MPa, and AccelRatio>10% are satisfied (step ST12). That is, these determinations are performed in order to perform a specific determination on whether the STP is an ON state, the M/C pressure is small, and the vehicle 1 is in an acceleration state (FIG. 3, step ST1). That is, as for the determination on whether the STP is an ON state, the control determining unit 64 determines whether the condition of STP=ON by determining whether the stop lamp switch 26 acquired by the traveling state acquiring unit 62 is an ON state.

Further, as for the specific determination on whether the M/C pressure is small, it is determined whether the PMC as the master cylinder pressure detected by the master cylinder pressure sensor 45 is smaller than 0.6 MPa which is set in advance as a threshold value. The control determining unit 64 determines whether the PMC as the detection result of the master cylinder pressure sensor 45 acquired by the traveling state acquiring unit 62 is smaller than 0.6 MPa.

Further, as for the specific determination on whether the vehicle 1 is in an acceleration state, the determination is performed based on the AccelRatio as the stepping amount of the accelerator pedal 20 in which a state where the accelerator pedal 20 is not stepped on is set as 0% and a state where the accelerator pedal 20 is completely stepped on is set as 100%. The control determining unit 64 determines whether the AccelRatio as the detection result of the accelerator opening degree sensor 21 acquired by the traveling state acquiring unit 62 is larger than 10%.

Further, in order to determine whether the vehicle 1 travels, the control determining unit 64 determines whether the V as the detection result of the vehicle speed sensor 16 acquired by the traveling state acquiring unit 62 is larger than 15 km/h. When it is determined that all conditions of V>15 km/h or more, STP=ON, and PMC<0.6 MPa, AccelRatio>10% are satisfied by the determination of the control determining unit 64 (step ST12, the determination of Yes), the STP ON fixing determination is permitted (step ST13). That is, a condition for determination on whether the stop lamp switch 26 is fixed to an ON state in the traveling state of the current vehicle 1, and a permission for the determination is performed by the control selecting unit 66 that belongs to the processing unit 61 of the ECU 60.

Next, the value of a determination counter CT1 for a STP ON fixing condition 1 as one condition for determining whether the STP is fixed to an ON state is added (step ST14). The STP ON fixing determination condition 1 becomes a condition in which a predetermined time elapses in a predetermined traveling state. Then, CT1 is set as a timer for counting the time, and is stored in the storage unit 70 of the ECU 60. As for the addition of the determination counter CT1 for the STP ON fixing condition 1, the control value calculating unit 65 adds the value of CT1, and estimates an elapse time in a predetermined traveling state, that is, a traveling state in which the conditions illustrated in step ST12 are satisfied by the addition.

Next, it is determined whether the condition of CT1>60 seconds is satisfied (step ST15). That is, the control determining unit 64 determines whether CT1 stored in the storage unit 70 is larger than 60 seconds. When it is determined that the condition of CT1>60 seconds is satisfied by the determination (step ST15, the determination of Yes), the control selecting unit 66 determines that the STP ON fixing determination condition 1 is satisfied (step ST16).

On the contrary, when it is determined that any one of the conditions of V>15 km/h or more, STP=ON, PMC<0.6 MPa, and AccelRatio>10% is not satisfied by the determination of the control determining unit 64 in step ST12 (the determination of No in step ST12), it is determined whether the conditions of STP=OFF and CT1>0 are satisfied (step ST17). This determination is performed by the control determining unit 64 based on CT1 stored in the storage unit 70 and the STP acquired by the traveling state acquiring unit 62.

When it is determined that the conditions of STP=OFF and CT1>0 are satisfied by the determination of the control determining unit 64 (step ST17, the determination of Yes), the STP ON fixing determination is prohibited, the STP ON fixing determination condition 1 is set to a non-establishment state, and CT1 and CT4 indicating the history of the sudden steering operation are all set to 0 (step ST18). That is, CT4 becomes a sudden steering history counter indicating the number of times of the sudden steering operation caused by a sudden change in steering angle.

When any of the conditions are not satisfied in step ST12 and all conditions are satisfied in step ST17, the condition for determining the abnormality of the stop lamp switch 26 is not satisfied, and the stop lamp switch 26 does not become an ON state. For this reason, the control selecting unit 66 prohibits the STP ON fixing determination. Further, in this case, the control selecting unit 66 determines that the STP ON fixing determination condition 1 is not satisfied. Further, the condition of CT1=CT4=0 is calculated by the control value calculating unit 65, and both CT1 and CT4 are set to 0.

In this way, when it is determined that the STP ON fixing determination is prohibited or the STP ON fixing determination condition 1 is not satisfied (step ST18) or when it is determined that the STP ON fixing determination condition 1 is satisfied (step ST16), it is determined whether the condition of V>60 km/h is satisfied in any case (step ST19). In addition, even when it is determined that the condition of CT1>60 seconds is not satisfied (the determination of No in step ST15) after the STP ON fixing determination is permitted (step ST13) or when it is determined that at least any one of the conditions of STP=OFF and CT1>0 is not satisfied after any one of the conditions is satisfied in step ST12 (the determination of No in step ST17), it is determined whether the condition of V>60 km/h is satisfied (step ST19). As for this determination, the control determining unit 64 determines whether the vehicle speed V which is detected by the vehicle speed sensor 16 and is acquired by the traveling state acquiring unit 62 is larger than 60 km/h.

When it is determined that the condition of V>60 km/h is satisfied (step ST19, the determination of Yes), the conditions of STR_MAX=MAX (STR, STR_MAX) and STR_MIN=MIN (STR, STR_MIN) are calculated (step ST20). Specifically, the storage unit 70 stores a maximum value STR_MAX and a minimum value STR_MIN when the steering angle detected by the steering angle sensor 36 is set indicated by STR, the maximum value of the steering angle STR detected by the steering angle sensor 36 is indicated by STR_MAX, and the minimum value of the steering angle STR detected by the steering angle sensor 36 is indicated by STR_MIN. Further, the function of the MAX (A, B) becomes a function that selects a large value among A and B, and the function of MIN (A, B) becomes a function that selects a small value among A and B.

The control value calculating unit 65 calculates STR_MAX=MAX (STR, STR_MAX) by using STR_MAX stored in the storage unit 70 and the current steering angle STR acquired by the traveling state acquiring unit 62. That is, a large value among the steering angle STR acquired by the traveling state acquiring unit 62 and STR_MAX stored in the storage unit 70 is set as STR_MAX. Further, the control value calculating unit 65 calculates STR_MIN=MIN (STR, STR_MIN) by using STR_MIN stored in the storage unit 70 and the current steering angle STR acquired by the traveling state acquiring unit 62. That is, a small value among the steering angle STR acquired by the traveling state acquiring unit 62 and STR_MIN stored in the storage unit 70 is set as STR_MIN.

On the contrary, when it is determined that the condition of V>60 km/h is not satisfied (the determination of No in step ST19) by the determination of the control determining unit 64 in step ST19, the calculation of STR_MAX=STR_MIN=STR, the calculation of CT2=CT3=0, and the calculation of CT4_MEM=OFF are respectively performed (step ST21).

Furthermore, CT2 mentioned herein becomes a left maximum rudder angle counter which indicates the time until the vehicle speed becomes smaller than a predetermined speed after the vehicle is steered leftward at a predetermined speed or more and a predetermined angle or more. Further, CT3 becomes a right maximum rudder angle counter which indicates the time until the vehicle speed becomes smaller than a predetermined speed after the vehicle is steered rightward at a predetermined speed or more and a predetermined angle or more. Further, CT4_MEM becomes a sudden steering history storage flag as a flag which indicates the history of the sudden steering operation.

When it is determined that the condition of V>60 km/h is not satisfied by the determination of the control determining unit 64 in step ST19, the values of STR_MAX and STR_MIN stored in the storage unit 70 are both set as the steering angle STR acquired by the traveling state acquiring unit 62. Further, the left maximum rudder angle counter CT2 and the right maximum rudder angle counter CT3 are both set to 0. Further, a sudden steering history storage flag CT4_MEM is disabled.

When the conditions of STR_MAX=MAX (STR, STR_MAX) and STR_MIN=MIN (STR, STR_MIN) are calculated (step ST20) by determining that the condition of V>60 km/h is satisfied (step ST19, the determination of Yes) among these determinations, it is determined whether the condition of STR_MAX>45° is satisfied (step ST22). In this determination, the control determining unit 64 determines whether STR_MAX stored in the storage unit 70 is larger than 45°. In this determination, it is determined whether the leftward steering angle is larger than the leftward threshold value, and in the embodiment, the leftward threshold value is set to 45°.

Furthermore, in the embodiment, the steering angle is set such that the steering angle in the straight advancing state is set to 0°, the steering angle in the leftward steering state is set to a positive angle, and the steering angle in the rightward steering state is set to a negative angle.

When the control determining unit 64 determines that the condition of STR_MAX>45° is satisfied (step ST22, the determination of Yes), the value of CT2 is added (step ST23). That is, the left maximum rudder angle counter CT2 becomes a counter which indicates the time until the vehicle speed becomes smaller than a predetermined speed after the vehicle is steered at a predetermined speed or more and a predetermined angle or more. In other words, CT2 is provided as a timer for counting the time. The left maximum rudder angle counter CT2 which is provided in this way is stored in the storage unit 70 of the ECU 60, and in the addition of the left maximum rudder angle counter CT2, the control value calculating unit 65 adds the value of CT2. Accordingly, the elapse time is measured by the addition.

On the contrary, when the control determining unit 64 determines that the condition of STR_MAX>45° is not satisfied (the determination of No in step ST22), the condition of CT2=0 is calculated (step ST24). That is, the control value calculating unit 65 resets CT2 by setting the left maximum rudder angle counter CT2 to 0.

In this way, when the left maximum rudder angle counter CT2 is calculated (step ST23, ST24), it is determined whether the condition of STR_MIN<-45° is satisfied (step ST25). In this determination, the control determining unit 64 determines whether STR_MIN stored in the storage unit 70 is smaller than -45°. In this determination, it is determined whether the rightward steering angle is larger than the rightward threshold value, and in the embodiment, the rightward threshold value is set to -45°. That is, it is determined whether the absolute value of the rightward steering angle is larger than the absolute value (|-45°|) of the rightward threshold value by determining whether STR_MIN is smaller than -45°.

When the control determining unit 64 determines that the condition of STR_MIN<-45° is satisfied (step ST25, the determination of Yes), the value of CT3 is added (step ST26). That is, the right maximum rudder angle counter CT3 becomes a counter which indicates the time until the vehicle speed becomes smaller than a predetermined speed after the vehicle is steered at a predetermined speed or more and a predetermined angle or more. In other words, CT3 is provided as a timer for counting the time. The right maximum rudder angle counter CT3 which is provided in this way is stored in the storage unit 70 of the ECU 60. In the addition of the right maximum rudder angle counter CT3, the control value calculating unit 65 adds the value of CT3, and hence the elapse time is estimated by the addition.

On the contrary, when the control determining unit 64 determines that the condition of STR_MIN<-45° is not satisfied (the determination of No in step ST25), the condition of CT3=0 is calculated (step ST27). That is, the control value calculating unit 65 resets CT3 by setting the right maximum rudder angle counter CT3 to 0.

When the right maximum rudder angle counter CT3 is calculated in this way (step ST26, ST27), it is determined whether the condition of CT4_MEM=OFF is satisfied (step ST28). In this determination, it is determined whether the sudden steering history storage flag CT4_MEM stored in the storage unit 70 is disabled, that is, the sudden steering history is stored.

When it is determined that the condition of CT4_MEM=OFF is satisfied by this determination (step ST28, the determination of Yes), it is determined whether both conditions of 0<CT2<1.5 seconds and CT3>0 are satisfied (step ST29). That is, the control determining unit 64 determines whether the left maximum rudder angle counter CT2 is larger than 0 and smaller than 1.5 seconds and the right maximum rudder angle counter CT3 is larger than 0.

When at least one of the conditions of 0<CT2<1.5 seconds and CT3>0 is not satisfied (the determination of No in step ST29), it is determined whether both conditions of 0<CT3<1.5 seconds and CT2>0 are not satisfied (step ST30). That is, the control determining unit 64 determines whether the right maximum rudder angle counter CT3 is larger than 0 and smaller than 1.5 seconds and the left maximum rudder angle counter CT2 is larger than 0.

When the control determining unit 64 determines that both conditions of 0<CT2<1.5 seconds and CT3>0 are satisfied (step ST29, the determination of Yes) or both conditions of 0<CT3<1.5 seconds and CT2>0 are satisfied (step ST30, the determination of Yes), the condition of CT4=CT4+1 is calculated (step ST31). That is, when it is determined that the vehicle speed V is larger than 60 km/h (step ST19, the determination of Yes), the conditions of 0<CT2<1.5 seconds and 0<CT3<1.5 seconds are all satisfied, it is possible to determine that the vehicle 1 is suddenly steered.

In other words, since it is possible to determine that the vehicle is steered leftward and rightward at a steering angle larger than a predetermined steering angle (in this case, 45°) while the vehicle 1 travels at a speed larger than a predetermined speed (in this case, 60 km/h), it is possible to determine that the vehicle 1 is suddenly steered leftward and rightward. The control determining unit 64 which performs these determinations based on the traveling state of the vehicle 1 is provided as a sudden steering determining unit. When the control determining unit 64 determines that the sudden steering operation is performed, 1 is added to the value of CT4 in a manner such that the control value calculating unit 65 increases the value of the sudden steering history counter CT4.

Next, the condition of CT4_MEM=ON is set (step ST32). That is, the control selecting unit 66 enables the sudden steering history storage flag CT4_MEM.

When the condition of CT4_MEM=ON is selected by the control selecting unit 66, it is determined whether the STP ON fixing determination condition 1 is satisfied and the condition of CT4>1 is satisfied (step ST33). The determination of step ST33 is also performed when it is determined that the condition of CT4_MEM=OFF is not satisfied by the determination of step ST28 (the determination of No in step ST28), at least one of the conditions of 0<CT2<1.5 seconds and CT3>0 is not satisfied (the determination of No in step ST29), or at least one of the conditions of 0<CT3<1.5 seconds and CT2>0 is not satisfied (the determination of No in step ST30).

Further, the determination of step ST33 is also performed after it is determined that the condition of V>60 km/h is not satisfied by the determination of step ST19 (the determination of No in step ST19), the conditions of STR_MAX=STR_MIN=STR, CT2=CT3=0, and CT4_MEM=OFF are calculated (step ST21).

When it is determined that the STP ON fixing determination condition 1 is satisfied and the condition of CT4>1 is satisfied by the determination of step ST33 (step ST33, the determination of Yes), it is determined that the STP ON fixing abnormality is confirmed (step ST34). That is, the control selecting unit 66 that belongs to the processing unit 61 of the ECU 60 determines that the stop lamp switch 26 is abnormal in that the stop lamp switch 26 is fixed to an ON state regardless of the state of the brake pedal 25. In other words, the control selecting unit 66 determines that the stop lamp switch 26 is abnormal when it is determined that the stop lamp switch 26 is maintained in an ON state even when the control determining unit 64 determines that the sudden steering operation is performed.

Specifically, when it is determined that the condition of the sudden steering history counter CT4>1 is satisfied in the state where the STP ON fixing determination condition 1 is satisfied, the sudden steering operation is performed a plurality of times leftward and rightward while the STP is in an ON state. In this case, the STP is maintained in an ON state although the driver's weight moves due to the sudden change in turning direction so that the foot is separated from the brake pedal 25 or the left foot is moved from the brake pedal 25 to the footrest in advance by estimating the movement of the weight.

In this way, since the STP is maintained in an ON state although the brake pedal 25 is not obviously stepped on, it is determined that the STP ON fixing abnormality is confirmed (step ST34) by the determination of (step ST33, the determination of Yes). In this way, the control selecting unit 66 which determines that the STP ON fixing abnormality is confirmed is provided as a stop lamp switch abnormality determining unit which determines the abnormality of the stop lamp switch 26 based on the state of the stop lamp switch 26 and the determination result of the control determining unit 64. The control selecting unit 66 which is provided as the stop lamp switch abnormality determining unit determines that the STP ON fixing abnormality is confirmed by determining that the stop lamp switch 26 is abnormal if the control determining unit 64 determines that the sudden steering operation is performed when the ON state of the stop lamp switch 26 is detected.

When it is determined that the STP ON fixing abnormality is confirmed, the abnormality of the stop lamp switch 26 is notified to the driver by displaying an alarm or generating an alarm sound. Further, when the information on the ON state or the OFF state of the stop lamp switch 26 is used in the control other than the selection of the lighting state of the stop lamp 28, the control is changed to the control for the STP ON fixing abnormality.

On the contrary, when it is determined that the STP ON fixing determination condition 1 is not satisfied and/or the condition of CT4>1 is not satisfied (the determination of No in step ST33), the routine escapes from the process sequence.

The stop lamp switch abnormality detecting device 2 according to the embodiment determines the abnormality of the stop lamp switch 26 by performing a process according to such a sequence, and a specific determination based on the states obtained when the vehicle 1 travels will be described.

Figure 5:
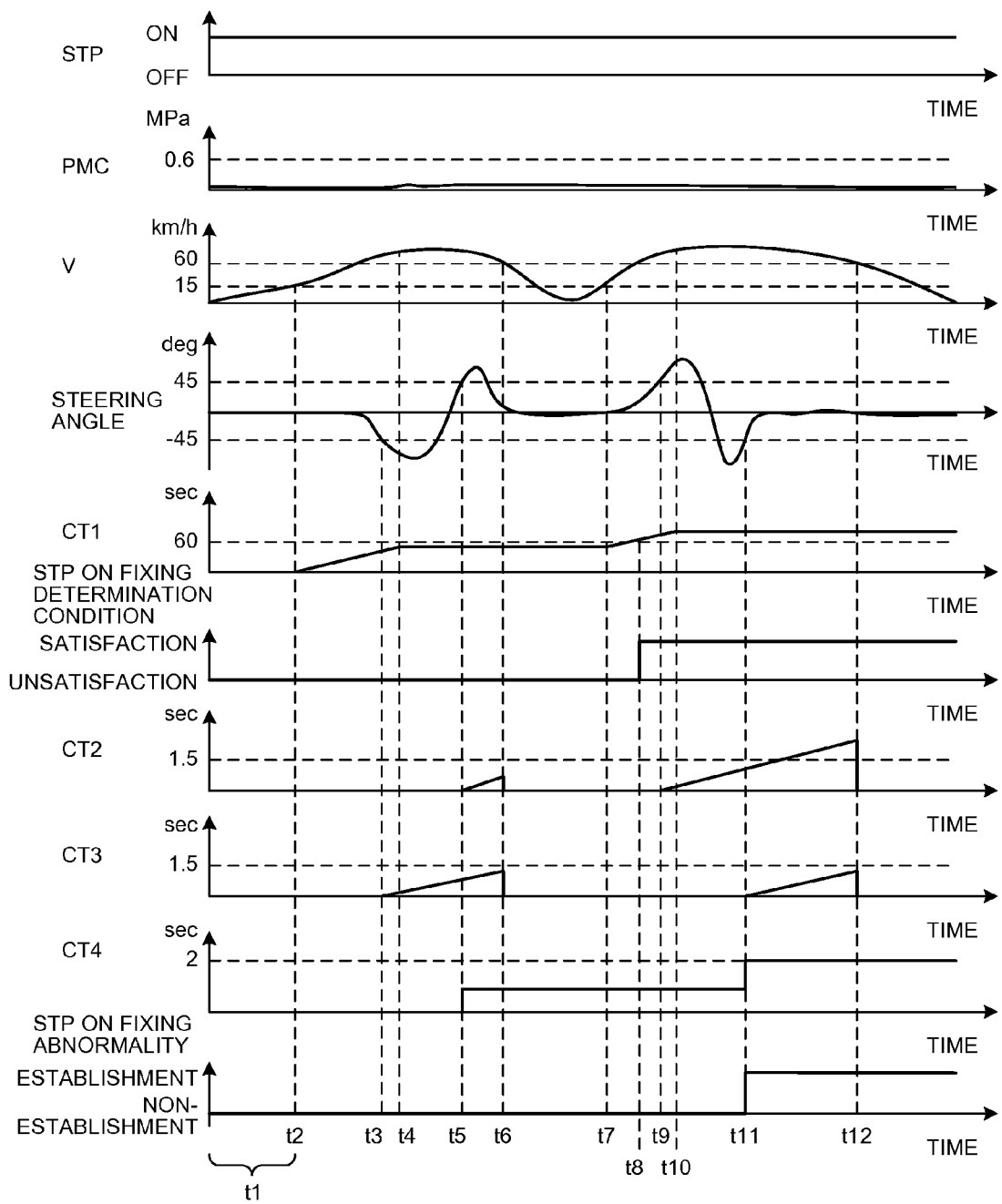
FIG. 5 is a diagram illustrating a sequence of a determination on a vehicle traveling state when the stop lamp switch is fixed to an ON state.

FIG. 5 is a diagram illustrating a sequence of a determination of the vehicle traveling state when the stop lamp switch is fixed to an ON state. In the description below, as illustrated in FIG. 5, the stop lamp switch 26 is fixed to an ON state, and a sequence of a process of determining the abnormality of the stop lamp switch 26 based on the traveling state of the vehicle 1 will be described. If the vehicle speed V is 15 km/h or less even when the PMC is smaller than 0.6 MPa when the vehicle 1 travels, the determination of the STP ON fixing abnormality is not performed (the determination of No in step ST12, FIG. 5: t1). When the PMC is smaller than 0.6 MPa and the vehicle speed V exceeds 15 km/h while the vehicle 1 travels, the elapse time is measured by adding the value of the determination counter CT1 for the STP ON fixing condition 1 (the determination of Yes in step ST12, FIG. 5: t2).

In this state, when the leftward/rightward steering angle exceeds 45°, the elapse time is measured by adding the value of the left maximum rudder angle counter CT2 or the value of the right maximum rudder angle counter CT3. For example, when the rightward steering angle exceeds 45° and the steering angle becomes smaller than −45°, the addition of the value of CT3 is started (the determination of Yes in step ST25, FIG. 5: t3). Further, when AccelRatio becomes smaller than 10% and the acceleration is not performed (the determination of No in step ST12, FIG. 5: t4), the addition of the value of the determination counter CT1 for the STP ON fixing condition 1 is stopped.

Further, when the leftward steering angle exceeds 45° so that the steering angle exceeds 45° as in the case of the rightward steering operation, the addition of the value of CT2 is started (the determination of Yes in step ST22, FIG. 5: t5). Further, in this case, since it is possible to determine that both the right maximum rudder angle counter CT3 and the left maximum rudder angle counter CT2 measure the time and the sudden steering operation is performed leftward or rightward, the sudden steering history counter CT4 is counted up (step ST31).

When AccelRatio becomes smaller than 10% so that the vehicle 1 is decelerated and the vehicle speed V becomes 60 km/h (the determination of No in step ST19, FIG. 5: t6), both the left maximum rudder angle counter CT2 and the right maximum rudder angle counter CT3 are set to 0 (step ST21), and the addition thereof is stopped.

When the vehicle speed V decreases and increases again so that the vehicle speed V exceeds 15 km/h (the determination of Yes in step ST12, FIG. 5: t7), the addition of the value of the determination counter CT1 for the STP ON fixing condition 1 is resumed (step ST14). Accordingly, when the addition time of the determination counter CT1 for the STP ON fixing condition 1 exceeds 60 seconds (the determination of Yes in step ST15, FIG. 5: t8), it is determined that the STP ON fixing determination condition 1 is satisfied (step ST16).

In this state, when the leftward steering angle exceeds 45° and the steering angle exceeds 45°, the addition of the value of the left maximum rudder angle counter CT2 is resumed (the determination of Yes in step ST22, FIG. 5: t9). Further, when AccelRatio becomes smaller than 10% so that the acceleration is not performed (the determination of No in step ST12, FIG. 5: t10), the addition of the value of the determination counter CT1 for the STP ON fixing condition 1 is stopped.

Further, when the rightward steering angle exceeds 45° and the steering angle becomes smaller than −45° as in the case of the leftward steering operation, the addition of the value of the right maximum rudder angle counter CT3 is resumed (the determination of Yes in step ST25, FIG. 5: t11). Accordingly, since it is possible to determine that both the left maximum rudder angle counter CT2 and the right maximum rudder angle counter CT3 count the time and the sudden steering operation is performed leftward or rightward, the sudden steering history counter CT4 is counted up (step ST31).

Since the operation of counting up the sudden steering history counter CT4 is the second time, CT4 becomes 2. Since it is determined that the STP ON fixing determination condition 1 is satisfied, it is determined that the STP ON fixing abnormality is confirmed when the sudden steering history counter CT4 becomes 2 so that the sudden steering history counter CT4 becomes larger than 1 (step ST34). That is, since the STP is maintained in an ON state although the driver releases a foot from the brake pedal 25 due to the sudden change of the turning direction, the control selecting unit 66 that belongs to the processing unit 61 of the ECU 60 determines that the STP ON fixing abnormality is confirmed.

When this determination is performed, a control for confirming the STP ON fixing abnormality is started by notifying the abnormality of the stop lamp switch 26 to the driver using, for example, an alarm lamp. In this way, the stop lamp switch abnormality detecting device 2 according to the embodiment determines the abnormality of the stop lamp switch 26 based on the balance of the vehicle speed V and the steering angle when the vehicle 1 travels.

When the STP ON fixing abnormality is confirmed and the driver gradually decreases the vehicle speed V so that the vehicle speed V becomes 60 km/h or less (the determination of No in step ST19, FIG. 5: t12), both values of the left maximum rudder angle counter CT2 and the right maximum rudder angle counter CT3 are set to 0 (step ST21), and the addition thereof is stopped.

In the stop lamp switch abnormality detecting device 2 according to the above-described embodiment, the control selecting unit 66 determines that the stop lamp switch 26 is abnormal if the control determining unit 64 determines that the sudden steering operation is performed when the ON state of the stop lamp switch 26 is detected. Accordingly, even in the case where a driver who habitually places a left foot on the brake pedal drives the vehicle, it is possible to more reliably determine whether the stop lamp switch 26 is fixed to an ON state by detecting the state of the stop lamp switch 26 during the sudden steering operation having a remarkably high possibility that the foot is separated from the brake pedal 25 due to the movement of the weight. As a result, the abnormality of the stop lamp switch 26 may be reliably determined.

Further, since the determination of the abnormality of the stop lamp switch 26 is performed when the determination of the sudden steering operation is performed a plurality of times, it is possible to accurately determine the abnormality when the abnormality is determined based on the state of the stop lamp switch 26 during the sudden steering operation. As a result, the abnormality of the stop lamp switch 26 may be reliably determined.

Further, since the determination of the sudden steering operation is performed when both leftward and rightward steering angles become predetermined values or more when the vehicle travels at a predetermined vehicle speed or more, it is possible to easily and reliably determine the sudden steering operation in which the foot of the driver is separated from the brake pedal 25 due to the movement of the weight of the driver. As a result, the abnormality of the stop lamp switch 26 may be reliably determined.

Modified Example

Furthermore, in the case where the stop lamp switch abnormality detecting device 2 determines the sudden steering operation, a state where each steering angle exceeds a predetermined steering angle (in the above-described embodiment, 45°) in the left and right direction is set as the first sudden steering operation. Then, when the sudden steering operation is performed two times while the stop lamp switch 26 is in an ON state, it is determined that the stop lamp switch 26 is abnormal. However, the number of times of the sudden steering operation may be set to an arbitrary number. For example, it may be determined that the stop lamp switch 26 is abnormal when the sudden steering operation is performed once while the stop lamp switch 26 is in an ON state or it may be determined that the stop lamp switch 26 is abnormal when the sudden steering operation is performed three times while the stop lamp switch 26 is in an ON state.

Further, in the stop lamp switch abnormality detecting device 2, the determination on the sudden steering operation is performed based on the steering angle detected by the steering angle sensor 36, but this determination may be performed based on a factor other than the steering angle. For example, it may be determined whether the sudden steering operation is performed based on the yaw rate detected by the yaw rate sensor 50 or the lateral acceleration detected by the lateral acceleration sensor 52.

Further, in the stop lamp switch abnormality detecting device 2, the determination on whether the vehicle 1 is in an acceleration state is performed based on the detection result of the accelerator opening degree sensor 21, but the determination on whether the vehicle is in an acceleration state may be performed based on a factor other than the detection result. For example, in the case where a forward monitoring camera used in an automatic driving mode or the like is mounted on the vehicle 1, a vehicle pitch angle may be estimated from an image captured by the camera, and a determination on whether the vehicle 1 is in an acceleration state may be performed based on the estimate pitch angle.

Further, the stop lamp switch abnormality detecting device 2 may use an appropriate combination of the configuration or the control used in the embodiment and the modified example or may use the other configuration or control. Since the stop lamp switch abnormality detecting device 2 determines that the stop lamp switch 26 is abnormal if it is determined that the sudden steering operation is performed when the ON state of the stop lamp switch 26 is detected regardless of the configuration or the control, the abnormality of the stop lamp switch 26 may be reliably determined.

The stop lamp switch abnormality detecting device according to the invention has an effect that the abnormality of the stop lamp switch may be reliably determined.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A stop lamp switch abnormality detecting device comprising:
    a stop lamp switch configured to switch a lighting state of a stop lamp by changing turned on and turned off of the stop lamp switch in conjunction with ON operation and OFF operation of a brake pedal;
    a sudden steering determining unit configured to determine whether a vehicle is suddenly steered; and
    a stop lamp switch abnormality determining unit configured to determine whether the stop lamp switch is abnormal based on a state of the stop lamp switch and a determination result of the sudden steering determining unit, wherein
    the stop lamp switch abnormality determining unit determines that the stop lamp switch is abnormal when it is determined that the stop lamp switch is maintained in an ON state at the time the sudden steering determining unit determines that sudden steering operation is performed.

2. The stop lamp switch abnormality detecting device according to claim 1, wherein
    the stop lamp switch abnormality determining unit determines that the stop lamp switch is abnormal when continuously detecting a state where the stop lamp switch is in an ON state at the time the sudden steering determining unit determines that the sudden steering operation is performed a plurality of times.

3. The stop lamp switch abnormality detecting device according to claim 1, wherein
    the sudden steering determining unit determines that the sudden steering operation is performed at the time detecting a state where a leftward steering angle becomes larger than a leftward threshold value and a rightward steering angle becomes larger than a rightward threshold value when the vehicle travels at a predetermined vehicle speed or more.

4. The stop lamp switch abnormality detecting device according to claim 2, wherein
    the sudden steering determining unit determines that the sudden steering operation is performed at the time detecting a state where a leftward steering angle becomes larger than a leftward threshold value and a rightward steering angle becomes larger than a rightward threshold value when the vehicle travels at a predetermined vehicle speed or more.

5. The stop lamp switch abnormality detecting device according to claim 1, wherein
    the sudden steering determining unit determines whether the sudden steering operation is performed as a determination on whether lateral acceleration is generated at the time a driver performs the OFF operation of the brake pedal.

6. The stop lamp switch abnormality detecting device according to claim 2, wherein
    the sudden steering determining unit determines whether the sudden steering operation is performed as a determination on whether lateral acceleration is generated at the time a driver performs the OFF operation of the brake pedal.

7. The stop lamp switch abnormality detecting device according to claim 3, wherein
    the sudden steering determining unit determines whether the sudden steering operation is performed as a determination on whether lateral acceleration is generated at the time a driver performs the OFF operation of the brake pedal.

* * * * *